United States Patent [19]

McKie

[11] Patent Number: 4,613,634

[45] Date of Patent: Sep. 23, 1986

[54] LOW WARP FILLED POLYOXYMETHYLENE COMPOSITIONS

[75] Inventor: Derrick B. McKie, Brooklyn, N.Y.

[73] Assignee: Celanese Corporation, New York, N.Y.

[21] Appl. No.: 775,922

[22] Filed: Sep. 13, 1985

[51] Int. Cl.⁴ .............................................. C08K 3/40
[52] U.S. Cl. .................................... 523/223; 523/444; 524/542
[58] Field of Search ............... 523/223, 444, 400, 466; 524/494, 542; 525/398, 410

[56] References Cited

U.S. PATENT DOCUMENTS

| | | |
|---|---|---|
| 2,989,506 | 6/1961 | Hudgin et al. |
| 2,989,509 | 6/1961 | Hudgin et al. |
| 3,027,352 | 3/1962 | Walling et al. |
| 3,174,948 | 3/1965 | Wall et al. |
| 3,254,053 | 5/1966 | Fisher et al. |
| 3,318,848 | 5/1967 | Clarke. |
| 3,356,646 | 12/1967 | Wynstra et al. |
| 3,450,665 | 6/1969 | Wagner et al. |
| 3,455,867 | 7/1969 | Berardinelli et al. |
| 3,631,124 | 12/1971 | Burg et al. ........................ 525/410 |
| 3,848,021 | 11/1974 | Sextro et al. ...................... 525/398 |
| 3,901,846 | 8/1975 | Freed. |
| 4,427,807 | 1/1984 | Zimmerman et al. ............... 523/466 |

FOREIGN PATENT DOCUMENTS 433186  4/1975  U.S.S.R. ............................ 523/223

Primary Examiner—Lewis T. Jacobs
Attorney, Agent, or Firm—Robert M. Shaw

[57] ABSTRACT

A low warp, filled oxymethylene polymer composition which when molded into products, exhibits improved surface appearance and low warpage as compared to products molded from glass fiber filled oxymethylene polymer compositions. The composition contains an oxymethylene polymer, a minor proportion of a phenoxy resin which is a compound of the formula:

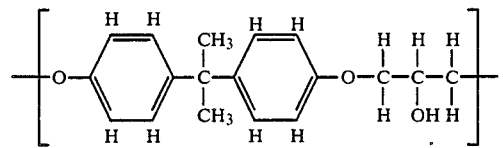

and glass beads.

10 Claims, No Drawings

LOW WARP FILLED POLYOXYMETHYLENE COMPOSITIONS

FIELD OF THE INVENTION

This invention relates to low warp, filled polyoxymethylene compositions. More particularly, this invention relates to glass bead filled polyoxymethylene compositions which when molded into products exhibit improved surface appearance, low warpage and improved flexural modulus.

BACKGROUND OF THE INVENTION

The terms oxymethylene polymer and polyoxymethylene as used interchangeably herein are meant to include oxymethylene homopolymers and diethers and diesters. Also included are oxymethylene copolymers, which includes oxymethylene polymers having at least 60 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, level, characteristics, color and the like depending, in part, upon their characteristics of preparation, on the catalytic polymerization technique employed and upon the various types of comonomers which may be incorporated into the polymer.

During molding processes, oxymethylene polymers are generally heated to temperatures between about 180° and 220° C. for relatively short periods between about 3 and about 10 minutes. Unless the thermal degradation rate of the polymer has been reduced to a desirably low level it has been found that molded products have uneven surface characteristics, due to gassing. In order to ameliorate this defect and reduce the degradation to a desirable level, chemical stabilizers are added to oxymethylene polymers.

The physical properties of these oxymethylene polymers also can be enhanced by addition to the polymers of glass strands, such as chopped glass fibers. In so doing, the tensile strength, flex strength and modulus are increased but the thermal coefficient of expansion of the polymer is reduced and warpage is significantly increased. Unfortunately, addition of these glass fibers has had an undesirable effect on thermal stability and impact strength, thus limiting the use, to a certain degree, to which the thus-filled oxymethylene polymers might be put. Another drawback is that the molded reinforced oxymethylene polymers often exhibit rough surfaces because the reinforcing agents tend to extend through the polymer surface.

For example, it is known in the art that the incorporation of glass strands into oxymethylene polymer in the presence of a small but effective amount of a halogen acid further significantly improves the physical properties of these glass-filled oxymethylene polymers.

The preferred halogen acid-yielding additives contemplated in the art for use in this application are the ammonium and amine salts of hydrogen chloride, hydrogen bromide and hydrogen iodide. Very desirable results are taught to be achieved by using the acids per se, aluminum chloride plus water, polyvinyl chloride, and like halogen acid (HY)-yielding compounds. The art teaches that generally, from 0.001% by weight to 0.1%, or slightly greater, of the acid is present for good results, the percentage by weight being based upon the total weight of the polymer and that preferably, from 0.005% to 0.02% by weight is employed.

The art teaches that the glass strands, on the other hand, may be present, and preferably are present, in substantially greater amounts. For example, the art teaches that results may be achieved when blending equal weights of oxypolymer and glass strands, and that enhanced properties are achieved using as little as 10 weight percent glass strands based upon the total weight of the glass and polymer in the composition. This is said to be particularly true when using chopped glass fibers in the one-sixteenth (1/16″) inch to one-half (½″) inch size range.

It is also known in the art that incorporation of both an isocyanate and glass strands in oxymethylene polymers, preferably in the presence of a small but effective amount of catalyst, has a potentiating or synergistic effect on the physical properties of these polymers. For reasons which are not fully understood, not only are tensile strength and flex strength improved, but impact strength is enhanced. Insofar as tensile strength and flex strength are concerned, the cooperative effect of the isocyanate and glass strands in the polymer is such that the total effect of these is greater than the sum of the two effects taken independently. This phenomenon is even more accentuated by the presence of the catalyst.

Another filled oxymethylene polymer composition known in the art includes a filler and small amounts of specific high molecular weight phenoxy resins and exhibits improved physical properties and surface effects of the molded articles. It is disclosed that the type of filler that can be used includes glass fibers (chopped or continuous rovings), asbestos fibers, cellulosic fibers, synthetic fibers, including graphite fibers, acicular calcium metasilicate and the like. The amount of reinforcing agent can range from about 2 to about 60 weight percent, preferably 5 to 60 weight percent based on the total molding composition.

The phenoxy resins disclosed as useful are characterized by a repeating structure:

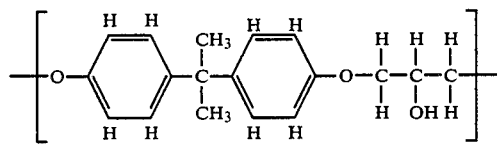

and have an average molecular weight range of from about 15,000 to 75,000. As is obvious, the terminal structure is completed with hydrogen atoms or some suitable end capping groups.

The thermoplastic phenoxy resin can be added to the reinforced oxymethylene resin in a number of ways, for example, by incorporating the phenoxy resin onto the reinforcing agent prior to its intimate blending with the oxymethylene resins, by simultaneously intimately mixing with the reinforcing agent and the oxymethylene resins, or by blending with the polymer and intimately blending with the reinforcing agents. Other mixing techniques can be used.

The amount of phenoxy resin incorporated can range from about 0.1 to about 8 weight percent preferably from about 0.5 to about 3 weight percent of the total thermoplastic oxymethylene molding resin.

While each of these prior art compositions is useful, none possess the combination of surface appearance, flexural modulus and low warpage in the products molded from the composites which some applications require. The present invention provides such a composition.

SUMMARY OF THE INVENTION

The present invention provides a filled oxymethylene polymer composition which when molded into products exhibits improved surface appearance and low warpage as compared to products molded from glass fiber filled oxymethylene polymers. The composition comprises from about 40 to 99 wt.% of the total composition of a normally solid oxymethylene polymer having an inherent viscosity of at least 1.0 (measured at 60° C. in a 0.1 weight percent solution in p-chlorophenol containing 2 weight percent of alpha-pinene), a molecular weight of at least 10,000 and a melting point of at least 150° C., about 0.1 to about 5 wt.% based on the total composition of a thermoplastic phenoxy resin having the repeating structure:

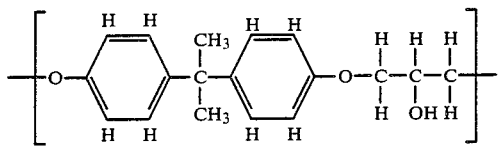

and an average molecular weight from about 15,000 to about 75,000, and glass beads in an amount of from about 1 to about 60 wt.%. of the total composition, having an average bead diameter distribution within the range of greater than 0 up to about 300 microns.

DESCRIPTION OF THE PREFERRED EMBODIMENTS

The oxymethylene polymers useful in the compositions of the present invention include oxymethylene homopolymers and diethers and diesters. Also useful and generally preferred are oxymethylene copolymers, which include oxymethylene polymers having at least 60 percent recurring oxymethylene units and at least one other unit derived from a monomer copolymerizable with the source of the oxymethylene units. Among the copolymers which are utilized in accordance with this aspect of the invention are those having a structure comprising recurring units having the formula

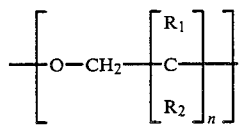

wherein each $R_1$ and $R_2$ is selected from the group consisting a hydrogen, lower alkyl and lower halogen substituted alkyl radicals and wherein n is an integer from zero to 5 and wherein n is zero in from 60 to 99.6 percent of the recurring units A preferred class of copolymers are those comprising from about 85 mole percent to 99.9 mole percent recurring —och2—groups.

Another preferred class of copolymers are those having a structure comprising recurring units having the formula $+O- CH_2—(CH_2)_n+$ wherein n is an integer from zero to 2 and wherein n is zero in from 60 to 99.6 percent of the recurring units. These copolymers are prepared by copolymerizing trioxane with a cyclic ether having the structure

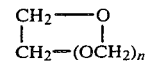

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide. Particularly preferred is a copolymer prepared by copolymerizing trioxane and ethylene oxide, 1,3-dioxolane or both.

High molecular weight oxymethylene polymers may be prepared in high yields and with rapid reaction rates by the use of catalysts comprising boron fluoride coordinate compounds in which oxygen or sulfur is the donor atom, as described in U.S. Pat. No. 2,989,509.

The copolymers useful in the present invention have typically and preferably been subjected to either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commercial practice. A useful solution hydrolysis process is disclosed in U.S. Pat. No. 3,174,948 and a useful melt hydrolysis process is disclosed in U.S. Pat. No. 3,318,848.

The oxymethylene polymers that are modified according to this invention are thermoplastic materials having a molecular weight of at least 5,000, a melting point of at least 100° C. and an inherent viscosity of at least 0.6 (measured at 60° C. in a 0.1 weight percent solution in p-chlorophenol containing 2 weight percent of alpha-pinene), preferably they have a molecular weight of at least 10,000, a melting point of at least 150° C. and an inherent viscosity of at least 1.0 (measured at 60° C. in a 0.1 weight percent solution in p-chlorophenol containing 2 weight percent of alpha-pinene).

The phenoxy resins useful in the composition present of the present invention are high molecular weight thermoplastic resins which are produced from 2,2-bis(4-hyroxyphenyl)propane and epichlorohydrin according to the procedure as described in U.S. Pat. No. 3,356,646 which is incorporated herein by this reference. The basic chemical structure of the phenoxy resins is similar to that of epoxy resins. They are, however, a separate and unique resin class, differing from epoxies in several important characteristics:

1. Phenoxy resins are tough and ductile thermoplastics. Their average molecular weight ranges from 15,000 to 75,000 preferably from 20,000 to 50,000 compared with 340 to 13,000 for conventional epoxies which crosslink on polymerization.
2. Phenoxy resins do not have terminal highly reactive epoxy groups and are thermally stable materials with a long shelf life.
3. The phenoxy resins can be used without further chemical conversion. They require no catalysts, curing agents or hardeners to be useful products while epoxy resins require catalysts, curing agents or hardeners to be useful.

The phenoxy resins can be characterized by a repeating structure:

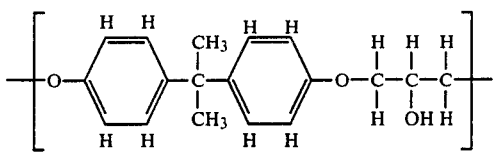

and have an average molecular weight range from about 15,000 to 75,000 preferably from about 20,000 to about 50,000. As is obvious, the terminal structure is completed with hydrogen atoms or some suitable end capping groups.

The thermoplastic phenoxy resin can be added to the reinforced oxymethylene resin in a number of ways, including: (1) by incorporating the phenoxy resin onto the glass beads prior to its intimate blending with the oxymethylene resins; (2) by simultaneously intimately mixing with the glass beads and the oxymethylene resins; and (3) by blending with the polymer and intimately blending with the glass beads. Other mixing techniques can be used.

The amount of phenoxy resin in the composition can range from about 0.1 to about 5 wt.%, preferably from about 0.2 to about 2 wt.% and more preferably from about 0.2 to about 1.2 wt.% of the total composition.

The glass beads useful in the present invention are commercially available from Potters Industries Inc., Hasbrouck Heights, N.J., an affiliate of the PQ Corporation, under the trademark Spheriglass ®. These useful commercial products are designated Spheriglass ® 3000E CPO3, Spheriglass ® 4000E CPO3 and Spheriglass ® 5000E CPO3.

The glass beads have an average bead diameter distribution within the range of from greater than 0 up to about 300 microns, preferably from greater than 0 up to about 100 microns; more preferably from greater than 0 up to about 88 microns. Particularly preferred are glass beads having an average bead diameter distribution within the range of from greater than 0 up to about 62 microns, more particularly from greater than 0 up to about 44 microns. Using smaller average bead diameter distributions results in enhanced surface appearance and selection of a lower diameter is therefore preferable but dependent on economic considerations and present technical limitations. As technology advances, it is expected that smaller diameter beads will be available at competitive costs and they will be preferred for use in the present invention. The beads can be made from E glass or A glass. E glass is preferred because A glass is detrimental to the thermal stability of the oxymethylene polymer. The beads will preferably contain typical glass coupling agents in amounts known to people skilled in the art, generally a monomolecular surface coating. When present, the surface coating is counted as part of the glass bead weight percentage.

The glass beads are present in an amount of from about 1 to about 60 wt. % of the total composition, preferably from about 10 to about 40 wt.%, and more preferably from about 15 to about 35 wt.% of the total composition. A particularly preferred amount is from about 25 to about 35 wt.% of the total composition.

The glass beads can be intimately mixed with the other components of the composition by either dry blending or melt blending, using extruders, heated rollers or other types of mixers. If desired, the glass beads can be blended with the monomers in the polymerization reaction as long as the polymerization reaction is not affected.

The three components are selected such that the total of the weight percentages for each component, based on the weight of the total composition, equals 100%.

The stabilized oxymethylene polymer compositions also include, if desired, plasticizers, pigments, lubricants and stabilizers, e.g., stabilizers against thermal or ultraviolet degradation or both, e.g., 1,6-hexamethylene bis-(3,5-di-t-butyl-4-hydroxyhydrocinnamate), 2,2'-dihydroxy-4,4'-dimethoxy-benzophenone; 2-hydroxy-4-methoxybenzophenone; 2-hydroxy-4-methoxy-4'-chlorobenzophenone; acid scavengers, e.g., cyanoguanidine; nucleants, UV screens and absorbers, polyamides, metal soaps, polymeric substances such as ethylene vinyl acetate, and color pigments which are compatible with oxymethylene polymers, e.g., red pigments such as azo dye and cadmium sulfide-cadmium selenide reds and "Mercadium" reds, blue pigments such as phthalocyanine blues, green pigments such as chromium oxide greens, white pigments such as titanium dioxide whites, and black pigments such as carbon blacks which can be incorporated in amounts of up to about 1% by weight in total, based upon the weight of the oxymethylene polymer.

EXAMPLES

The following examples present illustrative but non-limiting embodiments of the present invention. Unless otherwise stated, the oxymethylene polymers used in the following examples are oxymethylene copolymers of trioxane and ethylene oxide which were prepared as described in Example 1 of U.S. Pat. No. 3,254,053. Catalyst residues in the polymer were deactivated with an amine as described in U.S. Pat. No. 2,989,509, and the copolymers were then subjected to hydrolysis to remove unstable terminal units as described in U.S. Pat. No. 3,318,848 or U.S. Pat. No. 3,174,948.

The various analyses referred to in the examples were conducted as described in the following ASTM procedures:

(a) Notched Izod Impact Strength, $\frac{1}{8}$" bar, ASTM D256,
(b) Flexural Modulus and Strength, $\frac{1}{8}$" bar, ASTM D790,
(c) Tensile Strength, ASTM D638,
(d) Warpage is determined as follows:
   (1) Injection molded discs (4" diameter × 1/16" thick) are used to determine product warpage. Discs are conditioned for 24 hours at 23° C./50% relative humidity prior to evaluation. The thickness of each of ten discs molded from a given composition is measured in at least two areas parallel to the flow direction and two areas transverse to the flow direction. An average overall thickness is determined for the set of ten discs in this manner.
   (2) A thick, heavy granite platform called a bench comparator supporting a sensitive linear gauge is lowered onto the disc. The molded specimen is then rotated to determine the highest point on the disc as indicated by the maximum gauge readout. The greater the warpage of the disc, the higher the readout obtained. Gauge reading minus average disc thickness indicates warpage. This is given by the following equation:

$$W = H(m) - T(d)$$

where:
W = sample warpage
H(m) = maximum linear gauge readout
T(d) = overall average thickness for a set of sample discs

EXAMPLE 1

Compositions A through H having the components in the amounts identified in Table I were prepared by extrusion compounding with a 28 mm 3-lobe twin screw compounding extruder. Each composition was injection molded into tensile bars and flex bars which were used to assess warpage, tensile, flexural and impact properties. These values are reported in Table I.

EXAMPLE 2

Compositions I through N having the components in the amounts identified in Table II, were prepared as described in Example 1. Test discs (4" diameter, 1/16" thickness) were injection molded from each composition and evaluated for warpage. The results are reported in Table II.

about 40 to about 99 wt.% of the total composition, glass beads in an amount of from about 1 to about 60 wt.% of the total composition, having an average bead diameter distribution of from greater than 0 up to about 300 microns, and a thermoplastic phenoxy resin having a repeating structure:

$$\left[ -O - \underset{H}{\overset{H}{\bigcirc}} - \underset{CH_3}{\overset{CH_3}{\underset{|}{C}}} - \underset{H}{\overset{H}{\bigcirc}} - O - \underset{H}{\overset{H}{\underset{|}{C}}} - \underset{OH}{\overset{H}{\underset{|}{C}}} - \underset{H}{\overset{H}{\underset{|}{C}}} - \right]$$

and an average molecular weight range from about 15,000 to about 75,000, in an amount of from about 0.1 to about 5 wt.% of the total composition.

2. The composition of claim 1 wherein the amount of glass beads ranges from about 10 to about 40 wt.%.

3. The composition of claim 1 wherein the glass beads have an average bead diameter distribution of from greater than 0 up to about 100 microns.

4. The composition of claim 1 wherein the glass beads have an average bead diameter distribution of from greater than 0 up to about 88 microns.

5. The composition of claim 4 wherein the amount of glass beads ranges from about 15 to about 35 wt.%.

6. The composition of claim 1 wherein the oxymethylene polymer is a capped homopolymer.

7. The composition of claim 1 wherein the oxymethylene polymer is an oxymethylene copolymer comprising from about 85 mole percent to 99.9 mole percent recurring —OCH$_2$— groups.

8. The composition of claim 1 wherein the amount of phenoxy resin ranges from about 0.2 about 2 wt.% of the total composition.

9. The composition of claim 1 wherein the oxymethylene polymer is an oxymethylene copolymer having a structure comprising recurring units having the formula —O—CH$_2$—(CH$_2$)$_n$) wherein n is an integer from zero to 2 and wherein n is zero in from 60 to 99.6 percent of the recurring units.

10. The composition of claim 1, 7 or 9 wherein the phenoxy resin has an average molecular weight ranging from about 20,000 to about 50,000.

TABLE I

| Composition | Wt. % Polyoxymethylene | Wt. % Glass Beads[3] | Wt. % Phenoxy Resins[4] | Tensile Strength [kpsi] | Flexural Strength [kpsi] | Flexural Modulus [kpsi] × 10$^{-3}$ | Notched Izod Impact [ft. lbs./in.] |
|---|---|---|---|---|---|---|---|
| A[1] | 100 | 0 | 0 | 7.409 | 13.189 | 369 | 1.2 |
| B[2] | 75 | 25 | 0 | 5.276 | 10.451 | 497 | 0.58 |
| C | 79.8 | 20 | 0.2 | 7.186 | 12.956 | 433 | 0.56 |
| D | 74.8 | 25 | 0.2 | 6.464 | 12.257 | 505 | 0.67 |
| E | 69.8 | 30 | 0.2 | 6.119 | 11.891 | 539 | 0.49 |
| F | 64.8 | 35 | 0.2 | 5.887 | 11.189 | 556 | 0.52 |
| G | 74.2 | 25 | 0.8 | 6.950 | 13.439 | 498 | 0.69 |
| H | 73.8 | 25 | 1.2 | 6.394 | 13.477 | 511 | 0.66 |

[1]Control
[2]Comparative
[3]Spheriglass ® 3000E CP03, manufactured by Potter's Industries Inc., Hasbrouck Heights, New Jersey. The beads are made from E glass, have an average bead diameter distribution of from greater than 0 up to about 88 microns and contain a conventional glass coupling agent.
[4]Phenoxy PKHH, a high molecular weight polyhydroxy ether manufactured by Union Carbide Corporation, Danbury, Connecticut.

TABLE II

| Composition | Wt. % Polyoxymethylene | Wt. % Glass Fibers[2] | Wt. % Glass Beads[3] | Wt. % Phenoxy Resin[4] | Warpage (in.) |
|---|---|---|---|---|---|
| I[1] | 74.8 | 25 | 0 | 0.2 | 0.883 |
| J[1] | 89.8 | 10 | 0 | 0.2 | 0.316 |
| K[1] | 75.0 | 0 | 25.0 | 0 | 0.009 |
| L | 74.8 | 0 | 25.0 | 0.2 | 0.006 |
| M | 74.2 | 0 | 25.0 | 0.8 | 0.005 |
| N | 73.8 | 0 | 25.0 | 1.2 | 0.005 |

[1]Comparative.
[2]E-glass fibers, chopped strand, 3/16" length, K-filament, standard chemical sizing package.
[3]See Note 3 to Table I.
[4]See Note 4 to Table I.

I claim:

1. A low warp, filled oxymethylene polymer composition comprising a normally solid oxymethylene polymer having an inherent viscosity of at least 1.0 (measured at 60° C. in a 0.1 weight percent solution in p-chlorophenol containing 2 weight percent of alpha-pinene), a molecular weight of at least 10,000 and a melting point of at least 150° C., in an amount of from

* * * * *